United States Patent
Kee et al.

(10) Patent No.: US 12,493,123 B2
(45) Date of Patent: Dec. 9, 2025

(54) METHOD FOR ESTIMATING MULTIPATH ERROR OF PSEUDO-RANGE MEASUREMENT VALUE, AND POSITIONING METHOD USING SAME

(71) Applicant: SEOUL NATIONAL UNIVERSITY R&DB FOUNDATION, Seoul (KR)

(72) Inventors: Chang Don Kee, Seoul (KR); Jungbeom Kim, Seoul (KR); O Jong Kim, Seoul (KR); Yonghwan Bae, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 354 days.

(21) Appl. No.: 18/035,074

(22) PCT Filed: Oct. 14, 2021

(86) PCT No.: PCT/KR2021/014206
§ 371 (c)(1),
(2) Date: May 2, 2023

(87) PCT Pub. No.: WO2022/097946
PCT Pub. Date: May 12, 2022

(65) Prior Publication Data
US 2024/0012158 A1    Jan. 11, 2024

(30) Foreign Application Priority Data
Nov. 4, 2020    (KR) .................. 10-2020-0146091

(51) Int. Cl.
*G01S 19/22*    (2010.01)
*G01S 19/43*    (2010.01)
*G01S 19/47*    (2010.01)

(52) U.S. Cl.
CPC .............. *G01S 19/22* (2013.01); *G01S 19/43* (2013.01); *G01S 19/47* (2013.01)

(58) Field of Classification Search
CPC ........ G01S 19/22; G01S 19/428; G01S 19/43; G01S 19/47
See application file for complete search history.

(56) References Cited

U.S. PATENT DOCUMENTS 8,164,514 B1 *   4/2012   Yang ..................... G01S 5/0273
                                                    342/357.28
11,125,886 B2    9/2021   Hwang et al.
(Continued)

FOREIGN PATENT DOCUMENTS

| CN | 105241456 A | * | 1/2016 | ............. G01C 21/20 |
| CN | 106291607 A | * | 1/2017 | ............. G01S 19/22 |

(Continued)

OTHER PUBLICATIONS

S.W. Smith, The Scientist and Engineer's Guide to Digital Signal Processing, Second Edition, California Technical Publishing, p. 261 (Year: 1999).*

(Continued)

*Primary Examiner* — Robert W Hodge
*Assistant Examiner* — Fred H Mull
(74) *Attorney, Agent, or Firm* — Fenwick & West LLP

(57) ABSTRACT

A method for estimating a multipath error of a pseudo-range measurement value, comprising obtaining satellite navigation system information including a pseudo-range measurement value and a carrier phase measurement value; obtaining a time-differenced carrier phase (TDCP) measurement value by differentiating the carrier phase measurement value with respect to time; setting a monitoring variable for multipath error estimation by using the TDCP measurement value; detecting a change in multipath error using the (Continued)

monitoring variable, and determining a time period usable to estimate the multipath error; and estimating the multipath error at a specific time point using the change relative to a reference time. Accordingly, the location of a target can be precisely determined even in a downtown environment with severe signal distortion, by estimating the multipath error included in the pseudo-range measurement value, and compensating for or excluding the multipath error.

13 Claims, 10 Drawing Sheets

(56) References Cited

U.S. PATENT DOCUMENTS

| | | | | |
|---|---|---|---|---|
| 2005/0203702 A1* | 9/2005 | Sharpe | ............... | G01S 19/44 |
| | | | | 701/469 |
| 2013/0271318 A1* | 10/2013 | Doucet | ............... | G01S 19/22 |
| | | | | 342/357.64 |
| 2016/0377736 A1* | 12/2016 | Zeitzew | ............... | G01S 19/43 |
| | | | | 342/357.34 |
| 2020/0271792 A1 | 8/2020 | Hwang et al. | | |

FOREIGN PATENT DOCUMENTS

| | | | | |
|---|---|---|---|---|
| CN | 110376615 A | * | 10/2019 | ............ G01S 19/22 |
| KR | 10-0341801 B1 | | 11/2002 | |
| KR | 10-2014-0002137 A | | 1/2014 | |
| KR | 10-2019-0047886 A | | 5/2019 | |
| KR | 10-2019-0050157 A | | 5/2019 | |
| KR | 10-2020-0084651 A | | 7/2020 | |
| KR | 10-2020-0103491 A | | 9/2020 | |

OTHER PUBLICATIONS

J. Wendel et al., Time-Differenced Carrier Phase Measurements for Tightly Coupled GPS/INS Integration, 2006 IEEE/ION Position, Location, And Navigation Symposium, p. 54-60 (Year: 2006).*
PCT International Search Report, PCT/KR2021/014206, Feb. 24, 2022, 5 Pages.
Beitler, A. et al. "CMCD: Multipath Detection for Mobile GNSS Receivers." Proceedings of the 2015 International Technical Meeting of the Institute of Navigation, Jan. 26-28, 2015, pp. 455-464.
European Patent Office, Extended European Search Report, European Patent Application No. 21889411.1, Sep. 24, 2024, 11 pages.
Kim, J. et al. "A Low-Cost High-Precision Vehicle Navigation System for Urban Environment Using Time Differenced Carrier Phase Measurements." Proceedings of the 2020 International Technical Meeting of The Institute of Navigation, Jan. 21-24, 2020, pp. 597-611.
Lee, Y. et al. "Direct Estimation of Multipath in a Deep Urban Area using Multi-GNSS Carrier Phase Variation and Previous Position." Proceedings of the ION 2019 Pacific PNT Meeting, Apr. 8-11, 2019, pp. 728-736.
European Patent Office, Examination Report, European Patent Application No. 21889411.1, Sep. 15, 2025, 10 pages.
Pirsiavash, A. et al. "GNSS Code Multipath Mitigation by Cascading Measurement Monitoring Techniques." Sensors, Jun. 19, 2018, vol. 18, No. 6, pp. 1-32.

* cited by examiner

METHOD FOR ESTIMATING MULTIPATH ERROR OF PSEUDO-RANGE MEASUREMENT VALUE, AND POSITIONING METHOD USING SAME

CROSS REFERENCE TO RELATED APPLICATIONS

This application is a 35 U.S.C. 371 Patent Application of PCT Application No. PCT/KR2021/014206, filed Oct. 14, 2021, which claims the benefit of and priority to Republic of Korea Patent Application No. 10-2020-0146091, filed on Nov. 4, 2020, each of which is hereby incorporated by reference in its entirety.

TECHNICAL FIELD

The present disclosure relates to a method for estimating multipath error of pseudo-range measurement value and positioning method using the same, more particularly, to a method capable of precisely measuring position of a target by estimating multipath error included in a pseudo-range measurement value at a specific time point by using a time-differenced carrier phase measurement value and by compensating the multipath error.

BACKGROUND ART

A Global Navigation Satellite System (GNSS) is a satellite navigation system which determines a user's current position by receiving a signal from a satellite and calculating the distance between a receiver and the satellite. The satellite navigation system is primarily used in navigation devices for aircraft, vessels and vehicles, and recently, is being used in position based services offered by smartphones.

As illustrated in FIG. 1(A), a positioning algorithm based on the existing satellite navigation system information has the positioning accuracy of about 2 to 10 m error when receiving only a direct signal without distortion in an open environment. When correction information such as a signal error component calculated from a reference station is received, the error may be reduced down to about 1 m or less. On the other hand, as illustrated in FIG. 1(B), in a deep urban environment, a multipath error occurs by signal blockage or distortion due to buildings, which may significantly decrease the accuracy of location measurement.

The satellite navigation system information receiver such as a GNSS or a Global Positioning System (GPS) receiver may be classified into a low-cost receiver and a high-cost receiver according to the price and function. In general, the low-cost satellite navigation system information receiver determines the navigation solution (the current position) using pseudo-range measurements and is used in vehicle navigation systems and smartphones due to its comparatively low price. The high-cost satellite navigation system information receiver determines a target's position using carrier phase measurements and is used for more precise positioning, for example, metering and measurement equipment.

When compared with carrier phase measurements, pseudo-range measurements can obtain absolute value information, but measurement noise is as large as a few m level. In contrast, the carrier phase measurement has the advantage of being robust against signal distortion in the deep urban environment and having a small noise level of the mm level, but has a disadvantage that it is difficult to know the absolute size due to including the integer ambiguity term that is difficult to estimate values. There are many methods for determining the integer ambiguity, but in general, a considerable amount of time and complex calculation is required. In particular, to determine the integer ambiguity of the moving target such as a vehicle, a more complex calculation process is required.

Therefore, satellite navigation information receivers that perform navigation independently without correction information from a reference station determine position mainly by using pseudo-range measurement values. Since pseudo-range measurement values are severely affected by signal distortion, in the deep urban environment, the error of measurement values increases significantly.

DISCLOSURE

Technical Problem

An object of the disclosure is to provide a method for estimating a multipath error of a pseudo-range measurement due to signal distortion using a time-differenced value of a carrier phase measurement value. In addition, an object of the disclosure is to provide a method for precisely measuring the position of a target by compensating an estimated multipath error.

Technical Solution

A method for estimating a multipath error of a pseudo-range measurement value according to an embodiment of the present invention comprises the steps of obtaining satellite navigation system information including a pseudo-range measurement value and a carrier phase measurement value; obtaining a time-differenced carrier phase measurement value by differentiating the carrier phase measurement value with respect to an arbitrary time; setting a monitoring variable for multipath error estimation by using the time-differenced carrier phase measurement value; detecting a change amount of a multipath error regarding the arbitrary time by using the monitoring variable, and determining a time period usable for estimating the multipath error; and estimating the multipath error at a specific time point by using the change amount of the multipath error relative to an arbitrary reference time.

According to an embodiment, the monitoring variable may be set based on a characteristic value that is obtained a combination of measurement values including the time-differenced carrier phase measurement value, or a statistical value or probability distribution of the measurement values.

According to an embodiment, the monitoring variable may be set further based on additional information including at least one of DR information received from a DR sensor, visual information received from a vision sensor, radiolocation information received from a radiolocation sensor, correction information received from a reference station, and a multi-frequency measurement value.

According to an embodiment, the time period usable for estimating the multipath error is a period where a level of the multipath error is estimated to be less than or equal to a predetermined value based on the monitoring variable.

According to an embodiment, a length of the time period may be able to be preset or adjusted in real time.

According to an embodiment, the multipath error at the specific time point may be estimated using a multipath mitigation filter.

According to an embodiment, the method may further comprise detecting a change in integer ambiguity in the carrier phase measurement value, wherein the carrier phase measurement value and its time-differenced measurement value may be excluded in determining the relative position of the target when the change in the integer ambiguity in the carrier phase measurement value is detected.

According to an embodiment, the method may further comprise detecting a change in integer ambiguity in the carrier phase measurement value, wherein when the change in the integer ambiguity in the carrier phase measurement value is detected, the method may further perform estimating a magnitude of the change in the integrity ambiguity and then compensating a measurement value for the corresponding magnitude.

A computer program stored in a computer-readable recording medium for implementing the method for estimating a multipath error of a pseudo-range measurement value according to embodiments may be provided.

A positioning method according to a first embodiment of the disclosure comprises receiving satellite navigation system information including a pseudo-range measurement value and a carrier phase measurement value; determining a relative position of a target using a time-differenced carrier phase measurement value; estimating a multipath error of the pseudo-range measurement value; determining an initial position of the target by compensating or excluding the estimated multipath error; and determining an absolute position of the target by accumulating the relative position of the target over time with the initial position of the target.

A positioning method according to a second embodiment of the disclosure comprises receiving satellite navigation system information including a pseudo-range measurement value and a carrier phase measurement value; estimating a multipath error of the pseudo-range measurement value using a time-differenced carrier phase measurement value; and determining an absolute position of a target at a specific time point by compensating or excluding the estimated multipath error.

In the first or second embodiment, the method may further comprise receiving additional information including at least one of DR information received from a DR sensor, visual information received from a vision sensor, radiolocation information received from a radiolocation sensor, correction information received from a reference station, and a multi-frequency measurement value. The additional information may be used in at least one step of determining the relative position of the target, estimating the multipath error, determining the initial position of the target, and determining the absolute position of the target.

Advantageous Effect

According to an embodiment of the disclosure, a multipath error included in a pseudo-range measurement value may be estimated by using change amount information of a multipath error of a target acquired through a time-differenced carrier phase measurement value. By compensating the estimated multipath error, the position of the target can be accurately determined even in an urban environment with severe signal distortion.

MODE FOR INVENTION

Figure 1B:
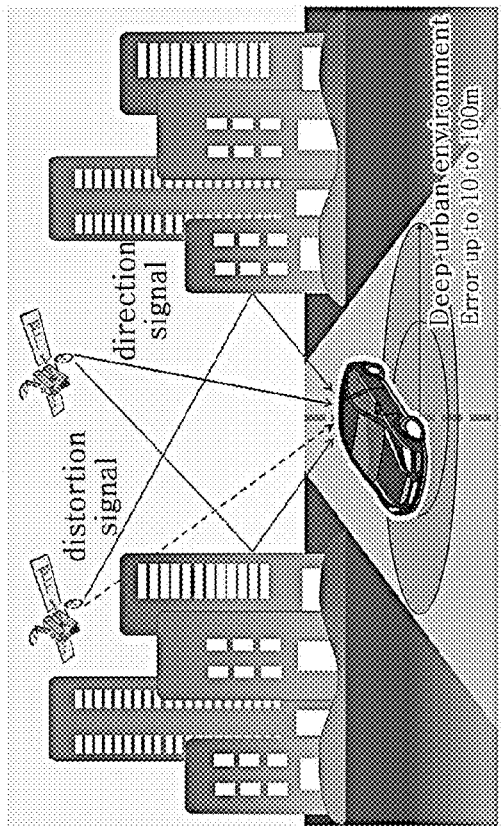
FIGS. 1A and 1B are diagrams showing a comparison of position measurement error in an open environment and a deep urban environment.
Figure 1A:
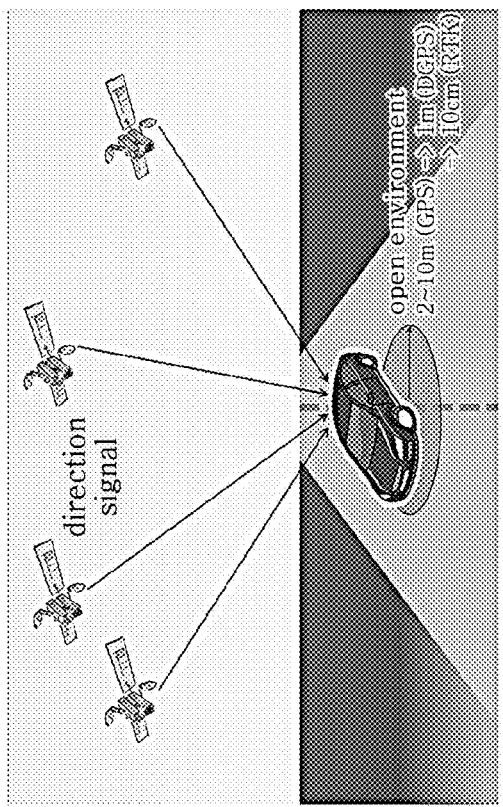

The terms as used herein are general terms selected as those being now used as widely as possible in consideration of functions, but they may vary depending on the intention of those skilled in the art or the convention or the emergence of new technology. Additionally, in certain cases, there may be terms arbitrarily selected by the applicant, and in this case, the meaning will be described in the corresponding description part of the specification. Accordingly, it should be noted that the terms as used herein should be interpreted based on the substantial meaning of the terms and the context throughout the specification, rather than simply the name of the terms.

Some of the embodiments of the present disclosure are described with reference to the flowchart presented in the drawings. Although the method is shown and illustrated as a series of blocks for brevity, the present disclosure is not limited to the order or sequence of the blocks, and some blocks may operate in a different order or sequence from the order or sequence shown and illustrated herein or may operate concurrently with other blocks, and a variety of other branches, flow paths and orders of blocks for achieving the identical or similar result may be implemented. Additionally, all the blocks shown in the drawings may not be required to implement the method described herein. Further, the method according to an embodiment of the present disclosure may be implemented in the form of a computer program for performing a series of processes, and the computer program may be recorded in computer readable recording media.

Hereinafter, embodiments will be described in detail with reference to the accompanying drawings and the context described in the accompanying drawings, but the claimed scope is not restricted or limited by the embodiments.

Figure 2:
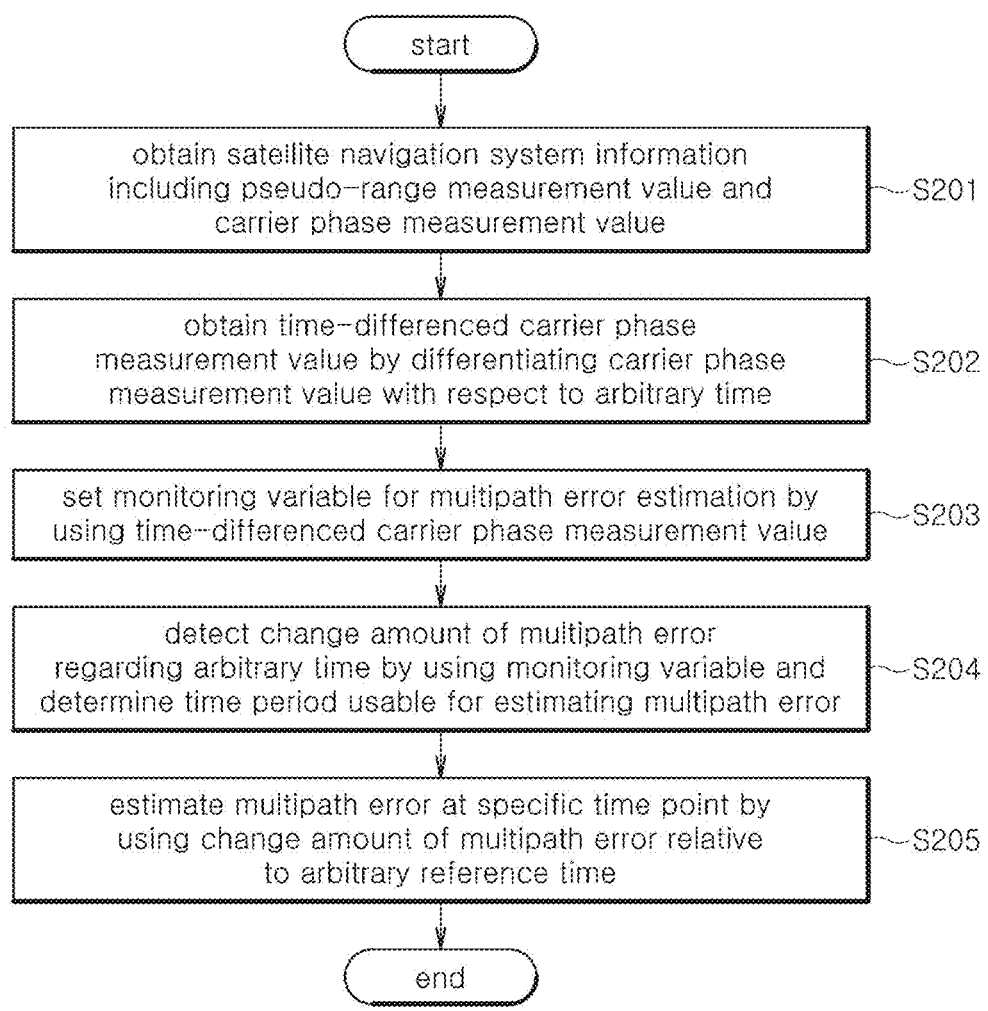
FIG. 2 is a flowchart showing a method step of estimating a multipath error of a pseudo-range measurement value according to an embodiment.

A Method for Estimating a Multipath Error of a Pseudo-Range Measurement Value FIG. 2 shows a method step of estimating a multipath error of a pseudo-range measurement value according to an embodiment. The method may be individually performed by a single processor or may be performed stepwise by a computing device or a plurality of processors equipped in an external server, and instructions for executing each step may be stored in a storage medium in the form of a computer program. It does not necessarily represent that each step is performed according to the time sequence.

In step S201, satellite navigation system information including a pseudo-range measurement value and a carrier phase measurement value is obtained. A single or multiple GNSS receivers or GPS receivers receive satellite navigation system information from a satellite, and the satellite navigation system information includes a carrier phase measurement value and a pseudo-range measurement value. In addition, additional information such as a Doppler measurement value and a noise ratio included in the satellite navigation system information may be used to estimate a multipath error.

In general, in order to determine the position of a target using the carrier phase measurement value, an integer ambiguity value, which is an arbitrary integer, must be calculated. However, in an embodiment of the disclosure, since the position of the target is determined using the time difference value of the carrier phase measurement value, there is no need to determine the integer ambiguity value. Therefore, a low-cost receiver for receiving only the satellite navigation system information can be used without the need of a separate system for determining integer ambiguity values.

In step S202, a time differenced carrier phase measurement (TDCP) value is obtained by differentiating the carrier phase measurement value with respect to arbitrary (reference) time. Here, the TDCP measurement value is the same concept as a change in a carrier phase measurement value over time.

The following equation is a numerical expression of the pseudo-range measurement value and the carrier phase measurement value.

$$\rho_u^i = d_u^i + B_u + T_u^i + I_u^i - b^i + M_u^i + \varepsilon_{\rho,u}^i =$$ [Equation 1]

$$(\bar{r}^i + \delta\bar{r}^i - \bar{r}_u) \cdot \bar{e}_u^i + B_u + T_u^i + I_u^i - b^i + M_u^i + \varepsilon_{\rho,u}^i$$

$$\phi_u^i = d_u^i + B_u + T_u^i - I_u^i - b^i + m_u^i + \varepsilon_{\phi,u}^i + \lambda N_u^i =$$ [Equation 2]

$$(\bar{r}^i + \delta\bar{r}^i - \bar{r}_u) \cdot \bar{e}_u^i + B_u + T_u^i - I_u^i - b^i + m_u^i + \varepsilon_{\phi,u}^i + \lambda N_u^i$$

In the above equation, $\rho_u^i$ denotes the pseudo-range measurement value for the i$^{th}$ satellite, $\phi_u^i$ denotes the carrier phase measurement value for the i$^{th}$ satellite, d denotes the distance between the satellite and the user, $\bar{r}^i$ denotes the position of the i$^{th}$ satellite, $\bar{r}_u$ denotes the absolute position of the user (the target), $\delta\bar{r}^i$ denotes the i$^{th}$ satellite orbit error, $\bar{e}^i$ denotes a line of sight vector of the i$^{th}$ satellite, B denotes the receiver field of view error, T denotes the troposphere, I denotes the ionosphere, b denotes the satellite field of view, N denotes the integer ambiguity, λ denotes the wavelength of carrier wave, M denotes the pseudo-range multipath error, m denotes the carrier phase multipath error, $\varepsilon_\rho$ denotes pseudo-range receiver noise, and $\varepsilon_\phi$ denotes carrier phase receiver noise.

In general, the pseudo-range multipath error M may increase up to a few hundreds of meters, and by contrast, the carrier phase multipath error in shows a much smaller level of up to 4 to 5 cm. Additionally, the carrier phase receiver noise $\varepsilon_\phi$ shows a much smaller level than the pseudo-range receiver noise $\varepsilon_\rho$.

The time-differenced carrier phase (TDCP) measurement value may be calculated by time-differencing Equation 2 as below (assume $\bar{e}_u^i(t_1) \approx \bar{e}_u^i(t_2)$).

$$\Delta_t\phi_u^i = \phi_u^i(t_2) - \phi_u^i(t_1) =$$ [Equation 3]

$$(\Delta_t\bar{r}^i + \Delta_t\delta\bar{r}^i - \Delta_t\bar{r}_u) \cdot \bar{e}_u^i + \Delta_t B_u + \Delta_t T_u^i - \Delta_t I_u^i - \Delta_t b^i + \Delta_t\varepsilon_{\phi,u}^i$$

In the above Equation 3, the term including integer ambiguity is eliminated through time-differencing. The acquired TDCP value is used to set the monitoring variable or determine the relative position of the target through the following process.

According to an embodiment, a step of detecting a change of integer ambiguity in the carrier phase measurement value may be further performed. To use the TDCP measurement value, the continuity of integer ambiguity over time should be guaranteed, and this is because the integer ambiguity is eliminated by time-differencing on the premise that the integer ambiguity term has a constant value that is time-invariant. Accordingly, if a discontinuity in the measurement value (a cycle slip) occurs in which a change of integer ambiguity occurs, a bias error exists, causing the continuous decrease in positioning accuracy.

When the change of integer ambiguity is detected (that is, when the discontinuity in the measurement value (a cycle slip) occurs), the corresponding measurement value is excluded in the subsequent relative position determination process, and the relative position is determined using only the measurement value from the remaining satellites, or the corresponding measurement value may be used after estimating and compensating the magnitude of change of integer ambiguity.

Figure 3:
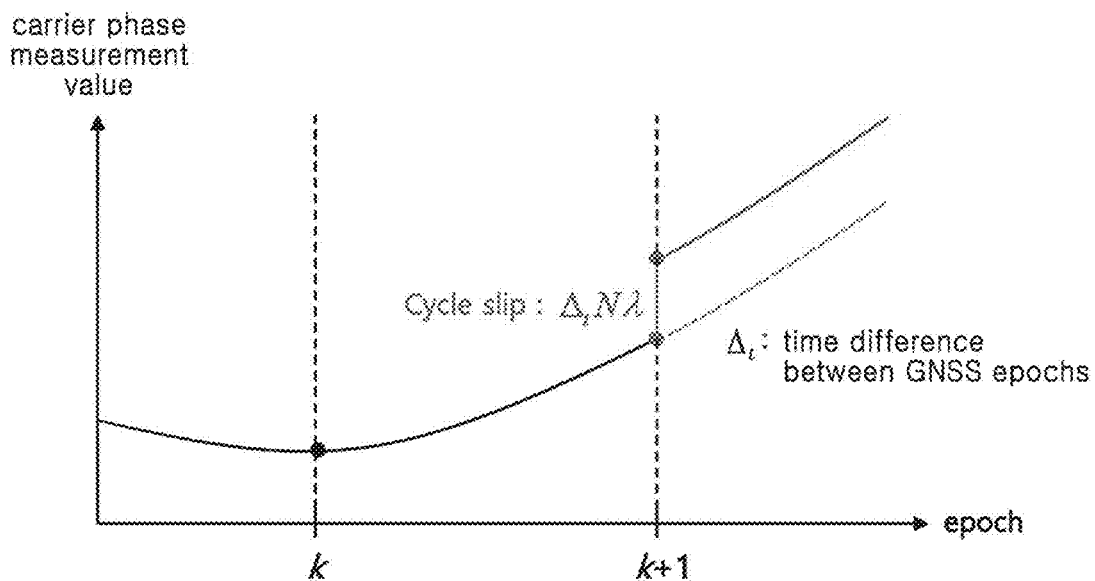
FIG. 3 is a graph illustrating that a change of integer ambiguity is detected in a time-differenced carrier phase measurement value-based navigation system according to an embodiment.

Referring to the graph of FIG. 3, a phenomenon occurs in which the carrier phase measurement value becomes discontinuous due to the change of integer ambiguity (k+1), and the corresponding measurement may be used after estimating and compensating the magnitude of change of integer ambiguity. In this case, it is expected to improve the navigation performance with the increasing visible satellites.

In an embodiment, in order to estimate the magnitude of change of integer ambiguity, various additional information received from additional sensors may be used. For example, DR information acquired from a DR sensor such as an accelerometer, a gyroscope, an odometer, an altimeter, and a geomagnetic, visual information acquired from a vision sensor such as a camera, a Lidar, and a Radar, radiolocation information acquired from a radiolocation sensor (LTE, WIFI), correction information received from the reference station (SBAS, Network-RTK, PPP), or the like may be used.

In another embodiment, not only single-frequency measurement values but also multi-frequency (dual, triple frequency) measurement values may be used, and in this case, a difference between measurement values (for example, an ionospheric error size difference, etc.) occurs due to the characteristics between frequencies, and using this principle, abnormal measurement values may be detected by combining many frequency measurement values.

In step S203, a monitoring variable for multipath error estimation is set by using the time-differenced carrier phase (TDCP) measurement value obtained in the step S202.

The monitoring variable is an index indicating a level of multipath error. For example, if a difference value between the time-differenced carrier phase measurement value and the time-differenced pseudo-range measurement value is set as the monitoring variable, the larger the multipath error included in the pseudo-range measurement value, the larger the difference between the two measurement value, so an extreme level of the multipath error may be found with a change in the monitoring variable.

In this way, characteristic values that can be determined by combination of the measurement values (time-differenced carrier phase measurement value, CNO, Doppler), or the statistical value (mean, standard deviation of Moving Window) or probability distribution (Skew Normal Distribution, Pareto Distribution, histogram distribution, etc.) of the measurements may be set as the monitoring variable. The monitoring variable may consist of one or more variables, and may also be used as a measurement value for estimating a multipath error.

According to an embodiment, the monitoring variable may be expressed as a standard deviation value of a moving window or a frequency of a histogram from a combination of measurement values that is a difference value between the time-differenced carrier phase measurement value and the time-differenced pseudo-range measurement value. When using the standard deviation value of the moving window, the monitoring variable MV may be expressed by Equation 4 as follows.

$$MV: std(|\delta\rho(k)-\delta\phi(k)|)(WindowSize=100)$$

where $\delta\rho(k)=\rho(k)-\rho(0), \delta\phi(k)=\phi(k)-\phi(0)$

【Equation 4】

Meanwhile, the monitoring variables may be set using the above-mentioned additional information. For example, additional information such as the DR information acquired from a DR sensor such as an accelerometer, a gyroscope, an odometer, an altimeter, and a geomagnetic, the visual information acquired from a vision sensor, the radiolocation information acquired from a radiolocation sensor (LTE, WIFI), the correction information received from the reference station (SBAS, Network-RTK, PPP), or the like may be used, or the dual/triple frequency measurement values may be used, so that the error factor of the monitoring variable may be reduced, and the accuracy of the estimation of multipath error can be improved.

In step S204, a change amount of multipath error regarding arbitrary time is detected by using the monitoring variable set in the step S203, and a time period that can be used to estimate the multipath error is determined.

Here, the time period that can be used for estimating the multipath error (hereinafter referred to as an estimation period) refers to a period where a level of the multipath error is less than or equal to a predetermined value. In other words, by tracking changes in measurement values based on the monitoring variable, it is possible to distinguish between a period where the multipath error occurs extremely and a period where there is not. By selecting a period where the error is lower than a predetermined level, it is possible to estimate the multipath error existing in the pseudo-range measurement value at a specific time point.

Figure 4:
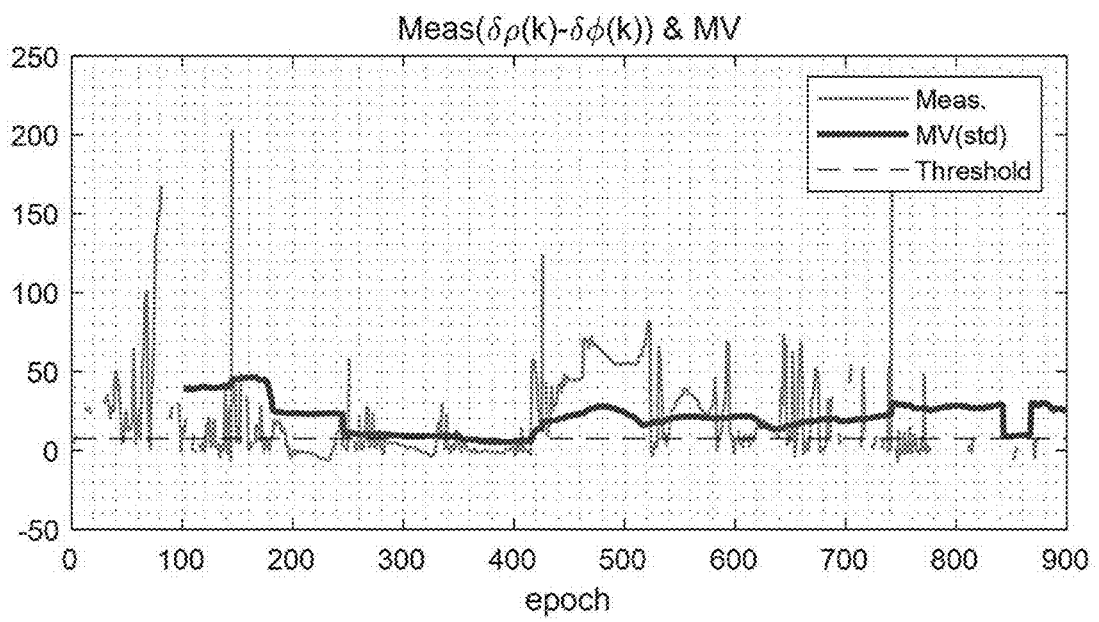
FIG. 4 is a graph illustrating a method of estimating a severity level of multipath error in a time-differenced carrier phase measurement value-based navigation system according to an embodiment.

FIG. 4 shows a value of a combination of measurement values and a value of a monitoring variable according to an embodiment. As shown in FIG. 4, the measurement values may be combined or a statistical value of the measurement values may be set as the monitoring variable, and an extreme level of multipath error may be estimated through the monitoring variable. In this case, it can be seen that the monitoring variable also exceeds a threshold for a period where the measurement value representing the extreme level of multipath error is large, and the extreme level may be distinguished.

Figure 5:
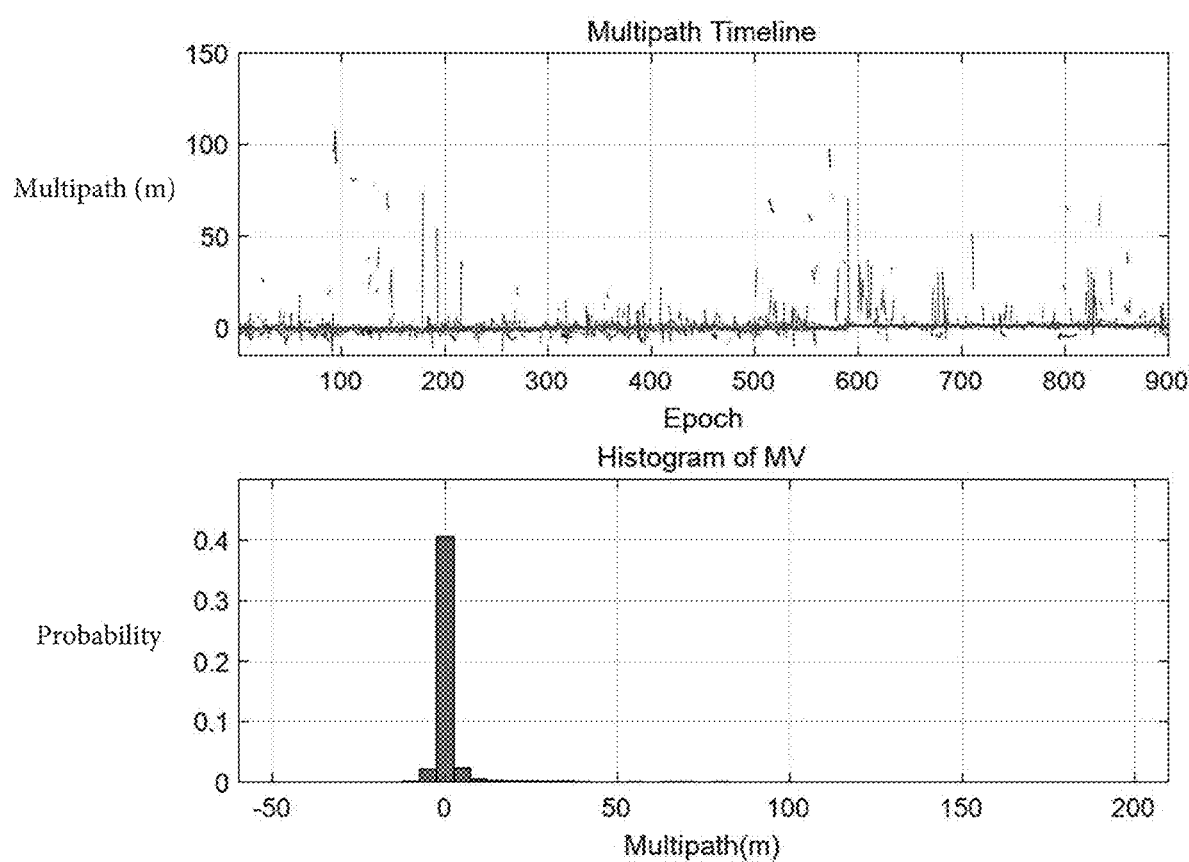
FIG. 5 is a graph illustrating a method of determining a time period that can be used for estimating a multipath error through set monitoring variables.

FIG. 5 is a graph illustrating a method of determining a time period that can be used for estimating a multipath error through the set monitoring variable. The graph in FIG. 5 shows a case where there is no multipath error at an arbitrary reference time. Referring to FIG. 5, when the monitoring variable is set to the histogram frequency of the measurement value combination, which is the difference between the time-differenced carrier phase measurement value and the time-differenced pseudo-range measurement value, a period where the multipath error is not extreme (i.e., a period with the highest frequency) may be identified immediately through the monitoring variable, and through this, the period with extreme multipath error may be excluded in the multipath error estimation process.

The length of the estimation period may be preset or adjusted in real time. For example, the multipath error is continuously estimated whenever the estimation period increases (in this case, performance may deteriorate due to the accumulation of error components). Alternatively, the multipath error is estimated and compensated for once every 50 seconds in the sum of the estimation periods. Alternatively, the multipath error may be estimated when the sum of the estimation periods reaches 25 seconds, and the multipath error may be estimated and compensated once every 50 seconds thereafter.

The divided estimation periods may be used over several steps, for example, using all measurement values without dividing steps, using all available estimation periods without dividing steps, using only when available estimation period is longer than a certain length, or using available estimation periods in a cascading manner by dividing into several steps based on the length of the period.

In this way, when the estimation period is used in several steps, the multipath error estimation by the estimation period in the previous step may remove the error component of the subsequent monitoring variable.

In step S205, the multipath error at specific time point is estimated by using the change amount of the multipath error relative to arbitrary reference time in an estimation period (i.e., a time period usable for estimating the multipath error).

As described above, the multipath error at specific time point may be estimated by selecting a period where the multipath error is not extreme (i.e., a period where the error is lower than a predetermined level) and using the amount of change in the multipath error relative to the reference time existing in this period.

According to an embodiment, a multipath mitigation filter such as a hatch filter or a Kalman filter may be used in the multipath error estimation process. The measurement value $\bar{\rho}(0,k)$ may be obtained using the pseudo-range including the multipath error at the specific time point, the carrier phase measurement value $\rho(0),\phi(0)$ and the pseudo-range in a period where the multipath errors are not extreme, the carrier phase measurement value $\rho(k),\phi(k)$, and the pseudo-range measurement value $\hat{\rho}(0)$ in which the multipath error at the specific time point is compensated using the measurement value may be obtained. In this case, the measurement values $\bar{\rho}(0,k)$ and $\hat{\rho}(0)$ may be expressed by Equations 5 and 6 as follows.

$$\bar{\rho}(0, k) = \rho(k) - [\phi(k) - \phi(0)] \quad \text{[Equation 5]}$$

$$\hat{\rho}(0) = \frac{1}{N_s}\sum_{k=0}^{N_s}\bar{\rho}(0, k) \quad \text{[Equation 6]}$$

By estimating and compensating the multipath error in this way, the multipath error included in the pseudo-range measurement value may be reduced. Since the method according to an embodiment uses the time-differenced carrier phase measurement value, even if the user is in an urban environment with extreme signal distortion, the multipath error estimation with constant performance is possible, and the multipath error may maintain a constant level for measurement values at all times.

Figure 6:
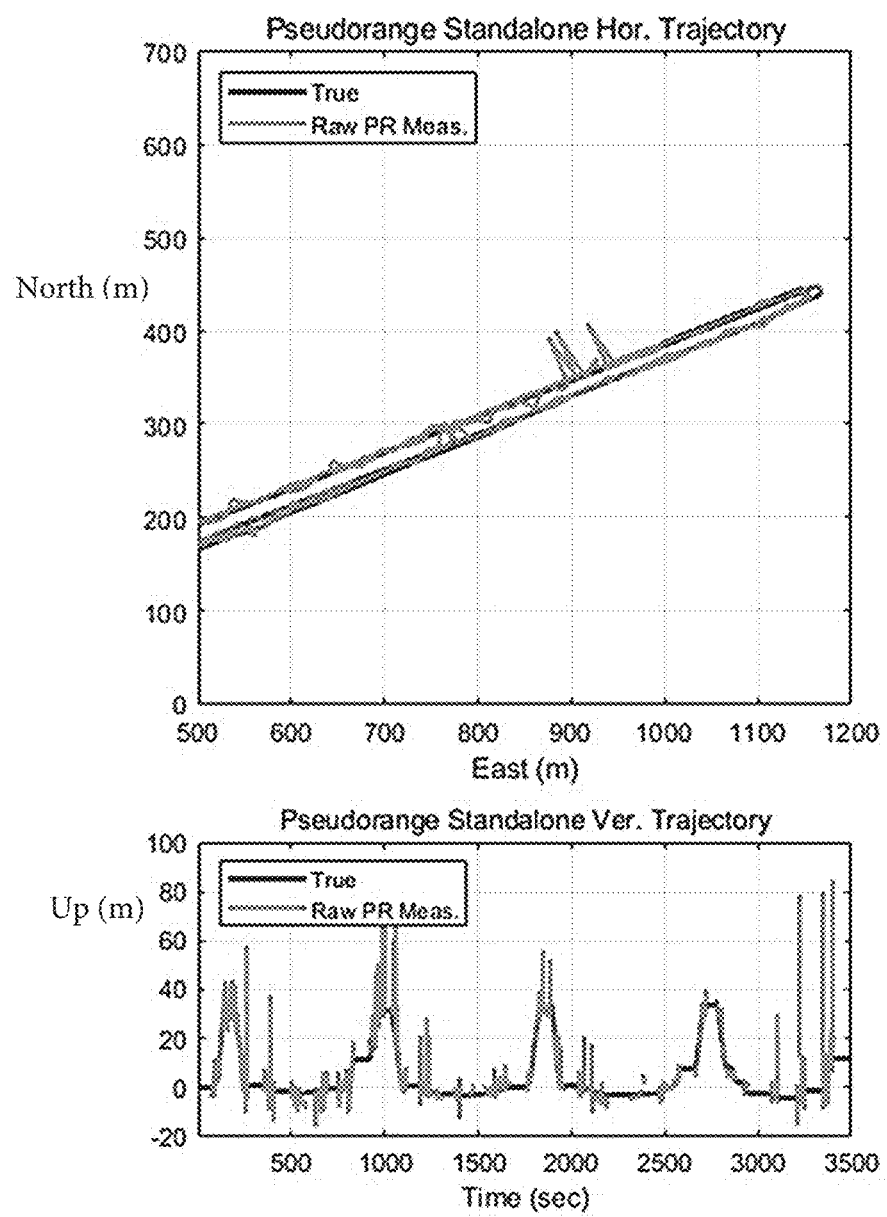
FIG. 6 is a graph showing a result of tracking a position of a target using a pseudo-range measurement value according to a prior art.
Figure 7:
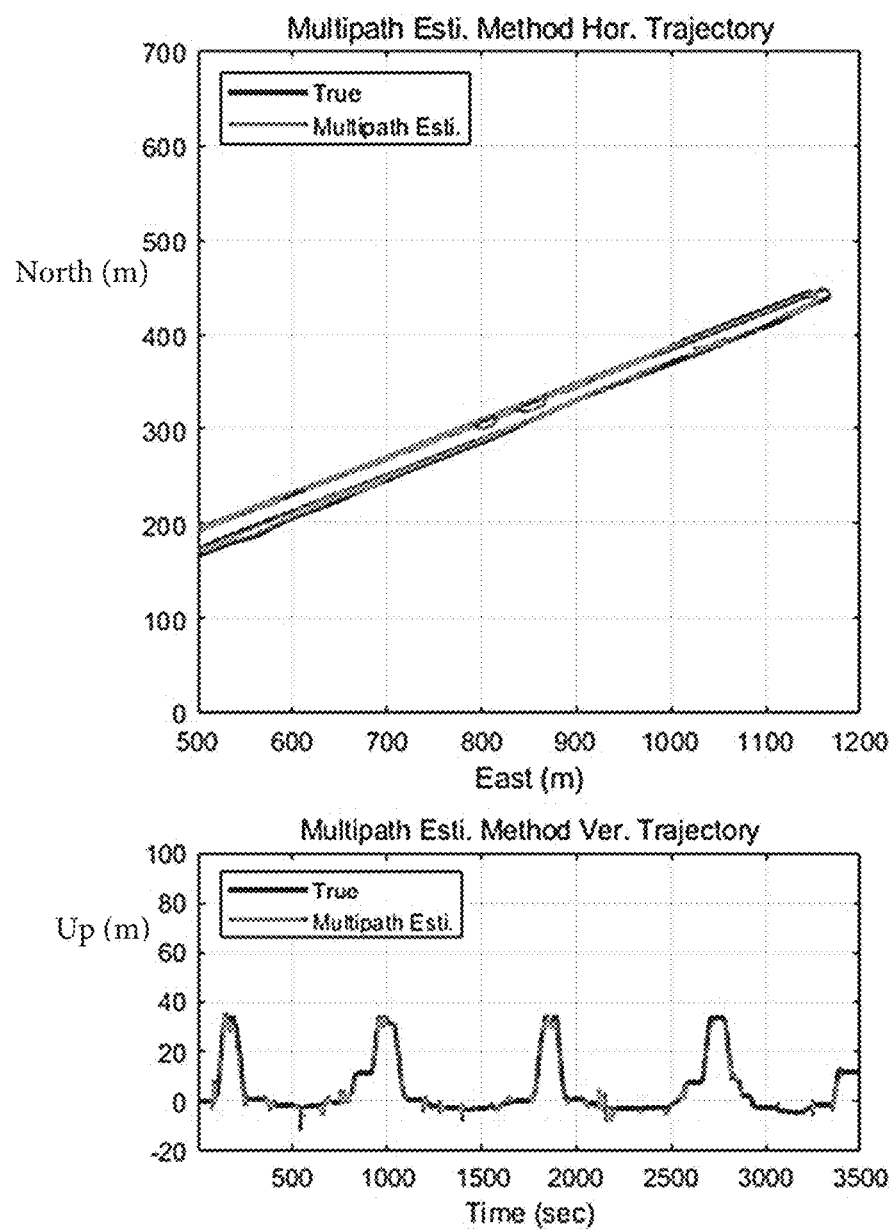
FIG. 7 is a graph showing a result of tracking a position of a target using a pseudo-range measurement value in which a multipath error is compensated according to an embodiment.

FIG. 6 is a graph showing a result of tracking a position of a target using a pseudo-range measurement value according to a prior art, and FIG. 7 is a graph showing a result of tracking a position of a target using a pseudo-range measurement value in which a multipath error is compensated according to an embodiment.

As shown in FIG. 6, it can be seen that the error and noise levels are extreme when the pseudo-range measurement value is used without compensation of the multipath error (Raw PR Meas.). On the other hand, when estimating and compensating the multipath errors (Multipath Esti.), as shown in FIG. 7, it is possible to obtain results that almost match the position information of the actual target.

Hereinafter, a method of determining an absolute position of a target by using the method of estimating the multipath error of the pseudo-range measurement value described above will be described.

Position Measurement Method by Multipath Error Estimation

First Embodiment

Figure 8:
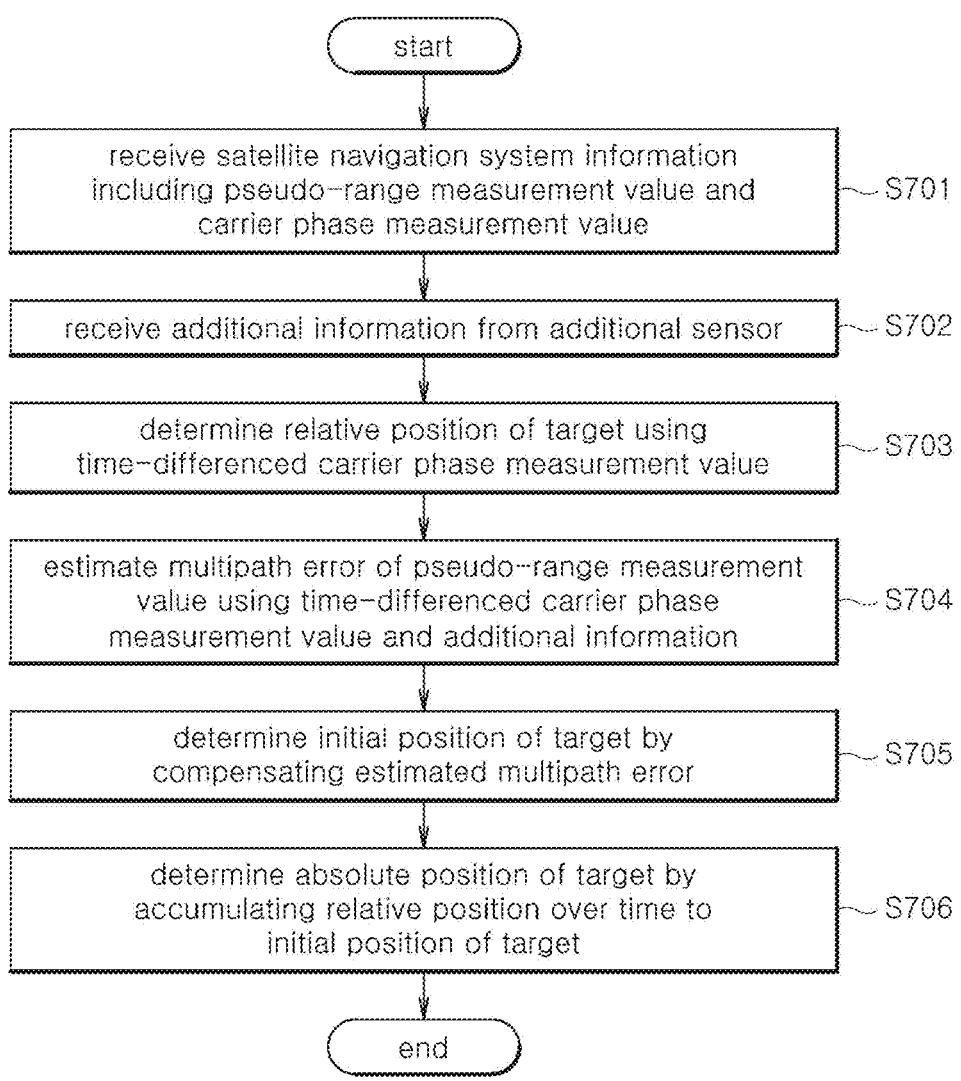
FIG. 8 is a flowchart showing a step of a position measurement method according to an embodiment.
Figure 9:
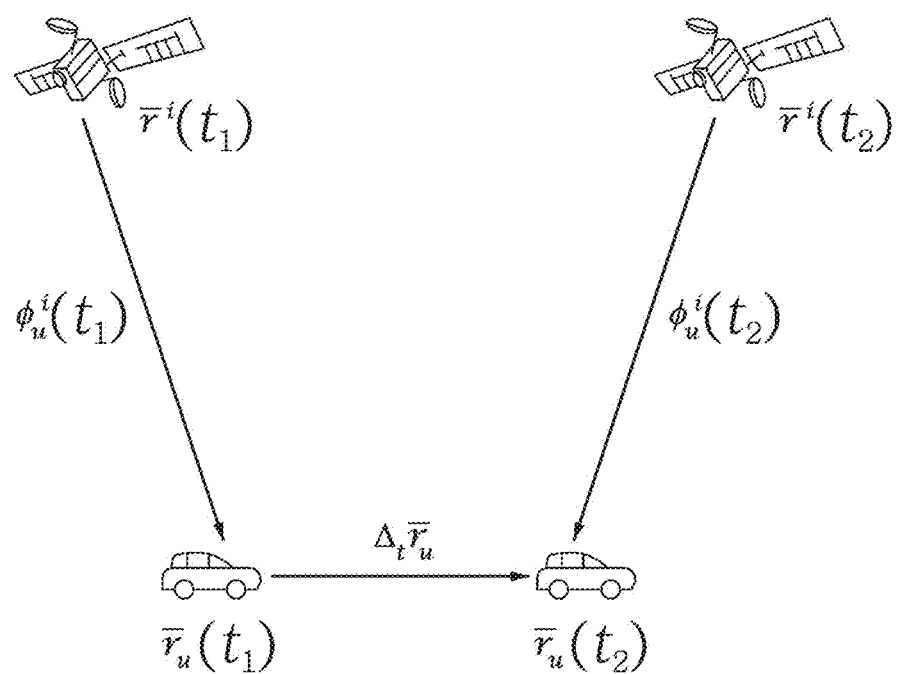
FIG. 9 is a diagram illustrating a concept of determining a relative position of a target in a navigation system according to an embodiment.

FIG. 8 shows the steps of a position measurement method according to a first embodiment. The method may be performed by at least one processor or implemented by a satellite navigation system including a processing device having at least one processor and a satellite navigation information reception antenna. The instructions for executing each step may be stored in a storage medium in the form of a computer program, and it does not necessarily represent that each step is performed according to the time sequence. For example, step S704 does not have to be performed after step S703 below, and step S704 may be performed prior to step S703 or the two steps may be performed in parallel.

In step S701, satellite navigation system information is received through a GNSS receiver or a GPS receiver. The satellite navigation system information includes a carrier phase measurement value and a pseudo-range measurement value.

In step S702, additional information is received from an additional sensor. Basically, an algorithm according to an embodiment may estimate the multipath error and determine the precise position only with the satellite navigation system information, but may improve the accuracy of error estimation and positioning by using the additional information. The additional information may include the DR information acquired from a DR sensor such as an accelerometer, a gyroscope, an odometer, an altimeter, and a geomagnetic, the visual information acquired from a vision sensor such as a camera, a Lidar, a Radar, the radiolocation information acquired from a radiolocation sensor (LTE, WIFI), the correction information received from the reference station (SBAS, Network-RTK, PPP), or the like.

In step S703, the relative position of a target is determined using the time-differenced carrier phase measurement value. The time-differenced carrier phase (TDCP) measurement value may be calculated from the above Equations 1 to 3, the following navigation equation may be obtained using the calculated TDCP measurement value.

$$\Delta_t \bar{r}_u \cdot \bar{e}_u^i - \Delta_t B_u = \Delta_t \bar{r}^i \cdot \bar{e}_u^i - \Delta_t \phi_u^i + \Delta_t E_u^i \quad \text{[Equation 7]}$$

$$\begin{bmatrix} \bar{e}_u^1 & -1 \\ \vdots & \vdots \\ \bar{e}_u^m & -1 \end{bmatrix} \begin{pmatrix} \Delta_t \bar{r}_u \\ \Delta_t B_u \end{pmatrix} = \begin{bmatrix} \Delta_t \bar{r}^1 \cdot \bar{e}_u^1 - \Delta_t \phi_u^1 + \Delta_t E_u^1 \\ \vdots \\ \Delta_t \bar{r}^m \cdot \bar{e}_u^m - \Delta_t \phi_u^m + \Delta_t E_u^m \end{bmatrix}$$

$$\Delta_t \bar{r}_u \cdot {}^i\nabla^R \bar{e}_u = {}^i\nabla^R \Delta_t \bar{r} \cdot \bar{e}_u - {}^i\nabla^R \Delta_t \phi_u + {}^i\nabla^R \Delta_t E_u \quad \text{[Equation 8]}$$

$$\begin{bmatrix} {}^1\nabla^R \bar{e}_u \\ \vdots \\ {}^{m-1}\nabla^R \bar{e}_u \end{bmatrix}(\Delta_t \bar{r}_u) = \begin{bmatrix} {}^1\nabla^R \Delta_t \bar{r} \cdot \bar{e}_u - {}^1\nabla^R \Delta_t \phi_u + {}^1\nabla^R \Delta_t E_u \\ \vdots \\ {}^{m-1}\nabla^R \Delta_t \bar{r} \cdot \bar{e}_u - {}^{m-1}\nabla^R \Delta_t \phi_u + {}^{m-1}\nabla^R \Delta_t E_u \end{bmatrix}$$

In Equation 7, $$\Delta_t E_u^i = \Delta_t T_u^i - \Delta_t I_u^i - \Delta_t b^i + \Delta_t \varepsilon_u^i + \delta \bar{r}^i \cdot \bar{e}_u^i$$

may be expressed, Equation 8 is an equation using the satellite difference. The superscript R indicates the reference satellite, and the corresponding equation is expressed as $\Delta z = H\Delta x$. The following equation for determining the relative position may be calculated from Equation 7 or 8.

$$\Delta_t r_u = (H^T H)^{-1} H^T \Delta z$$

$$\text{【Equation 9】}$$

FIG. 8 is a diagram illustrating a process of calculating the relative position of the target in the navigation system according to an embodiment. As shown in FIG. 8, a value corresponding to a difference between the position of the target at time $t_1$ and the position of the target at $t_2$, i.e., a movement distance, may be calculated.

Accordingly, it is possible to achieve precise relative position calculation with cm level of error using only the low-cost satellite navigation receiver using the single-frequency, single-constellation information without any assistance of a correction information system.

According to an embodiment, the use of the correction information (SBAS, Network-RTK, PPP, etc.) of the reference station may further improve the positioning accuracy. The error in the time-differenced carrier phase measurement value-based relative position is affected by changes in satellite navigation error components, and especially changes in ionospheric and tropospheric errors act as the most major causes of errors, and when the correction information of the reference station is used, it is possible to remove the errors, thereby achieving more precise positioning.

Further, using the multi-frequency measurement, it is possible to estimate and remove the tropospheric error without the correction information of the reference station, thereby improving the accuracy of the relative position, and when the number of visible satellites is increased using multi-constellation (USA GPS, Chinese BeiDou, European GALILEO, Russian GLONASS, etc.), Dilution of Precision ((DOP); uniformity of visible satellite distribution)

decreases, thereby improving the positioning accuracy (in this case, a frequency difference between measurements should be considered).

The use of the additional information is just optional, and basically, the embodiments of the disclosure can achieve precise relative position calculation with cm level of error using only the low-cost satellite navigation receiver using the single-frequency, single-constellation information without any assistance of a correction information system.

In this way, by using a differenced value for the carrier phase measurement value at an arbitrary time, it is possible to determine the change in the relative position of the target without determining integer ambiguity. As described above, it is possible to improve the reliability of positioning results by detecting a discontinuity m the measurement value (a cycle slip) before determining the relative position and compensating the magnitude of change in the integer ambiguity.

In step S704, the multipath error of the pseudo-range measurement value is estimated using the time-differenced carrier phase measurement value and the additional information. In step S704, the multipath error may be estimated through a process similar to the respective steps S201 to S205 described with reference to FIG. 2. In other words, by using a combination of measurement values, statistical values, probability distribution, etc., a monitoring variable is set to detect the amount of change in the multipath error over time, and the multipath error existing in the pseudo-range measurement value at a specific time point may be estimated by selecting a period where the multipath error is not extreme.

In step S705, the initial position of the target may be precisely determined by compensating or excluding the multipath error estimated in the step S704. The determination of the initial position requires absolute positional information rather than a change amount of relative position, the pseudo-range measurement value representing the absolute distance from the satellite to the target is used. Typically, in an urban environment, the error of the pseudo-range measurement value may increase to a few hundreds of meters due to the signal distortion caused by structures. Therefore, even if the change in the relative position of the target is precisely measured using the time-differenced carrier phase (TDCP) measurement value, it is difficult to accurately obtain the absolute position if the initial position information is inaccurate. According to an embodiment of the disclosure, it is possible to estimate the multipath error at a specific time point by using the TDCP, and if the pseudo-range measurement value is reconstructed by compensating the value, precise initial positioning is possible even in the urban environment.

In step S706, the absolute position is determined by accumulating the relative position over time from the target's initial position determined in the step S705.

According an embodiment, the absolute position may be determined by accumulating the relative position ($\Delta \bar{r}_u$) calculated by using the time-differenced carrier phase measurement value from the initial position ($\bar{r}_u(0)$). The equation for obtaining the absolute position of the target can be expressed as the following equation.

$$\bar{r}_u(t) = \bar{r}_u(0) + \Sigma \Delta \bar{r}_u$$

【Equation 10】

Additionally, the accuracy of absolute position measurement can be improved by combining with the additional information received from various additional sensors such as a DR sensor (an accelerometer, a gyroscope, an odometer, an altimeter, a geomagnetic, etc.), a vision sensor (a camera, a Lidar, and a Radar), a radiolocation sensor (LTE, WIFI).

The position measurement method according an embodiment may further include a confidence level determination step to determine a confidence level for the relative position or absolute position of the target based on the TDCP. The confidence level refers to a probability that a result of iteration produces the same result in the error range, and a warning is provided to the user about a dangerous situation at the time when the calculated result has the confidence level above the threshold, thereby ensuring the user's safety. For example, the time-difference carrier phase measurement value-based Relative RAIM (RRAIM) method may be applied as the Receiver Autonomous Integrity Monitoring (RAIM) algorithm of the satellite navigation receiver, and this is a method that is primarily used for aircraft user's vertical takeoff and landing guidance. The RRAIM method may have sufficient performance even in an environment in which visible satellites lack. Accordingly, this method enables reliable operation, in a deep urban environment in which visible satellites may lack due to obstruction by buildings and a variety of disturbing factors, so that it is possible to improve not only the accuracy of position measurement but also the reliability level.

According to an embodiment, in the same way as the position determination process, the absolute confidence level may be determined by simply accumulating the confidence level of the relative position measurement value from the initial confidence level. In this case, the confidence level may be improved by combining with the additional information. In an embodiment, the optimal confidence level may be calculated by combining the accelerometer or gyroscope based estimated position information with the satellite navigation system information using a Kalman filter (a filter primarily used to build an integration navigation system by combining GPS information with INS).

Figure 10:
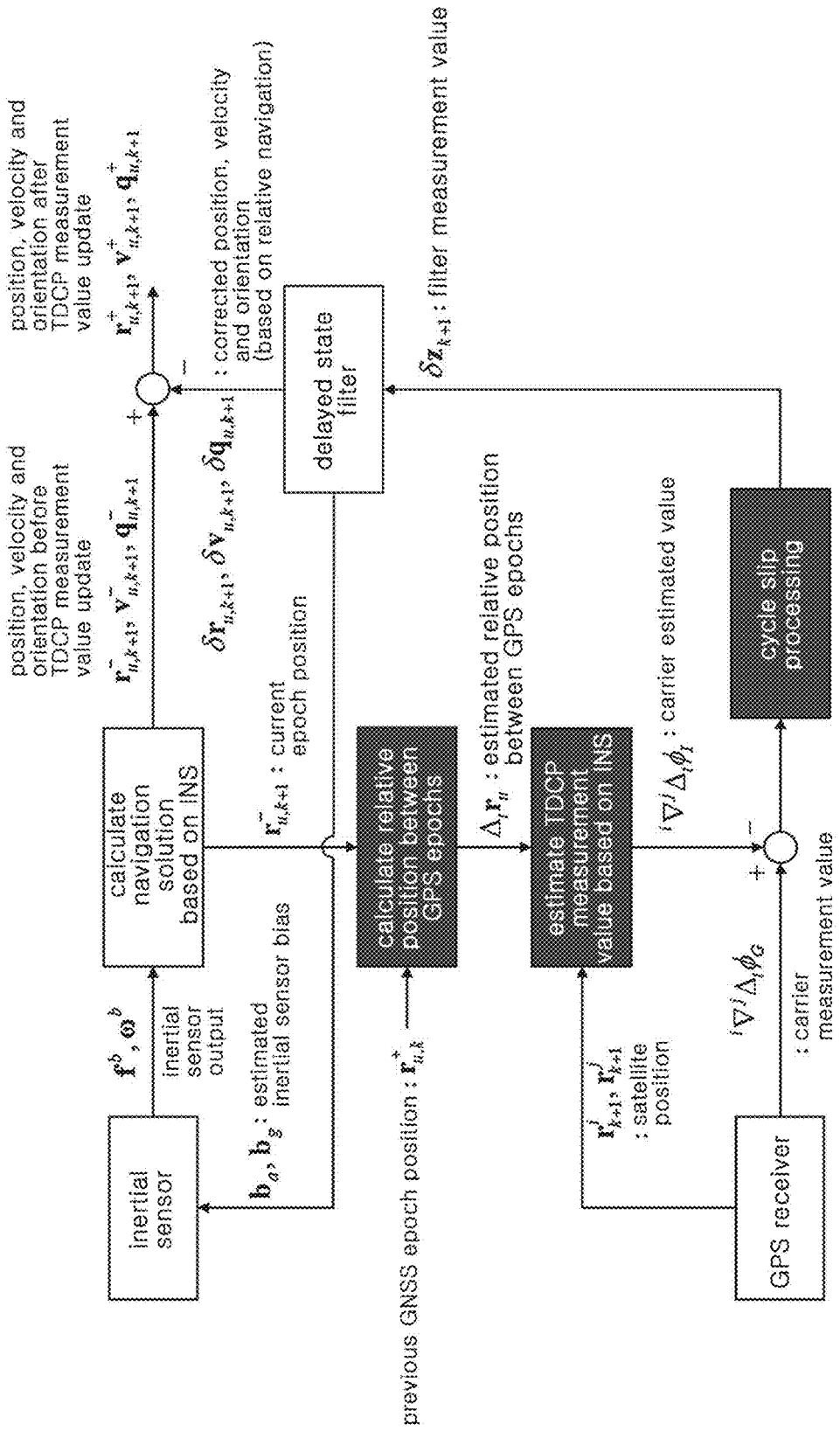
FIG. 10 is a block diagram showing a process of a navigation system according to an embodiment.

FIG. 10 is a block diagram showing the processing of the time-differenced carrier phase measurement value-based navigation system according to an embodiment, and shows the architecture of the TDCP/INS integrated navigation system. FIG. 10 shows a case in which the time-difference carrier phase measurement value is combined with the INS information as the additional information. It is possible to detect and compensate the integer ambiguity in the time-differenced carrier phase measurement value through the INS based additional information, and a Kalman Filter may be used when combining the measurement values that have passed through this with INS. Through this, finally, it is possible to determine the precise relative position and confidence level.

Since the existing time-differenced carrier phase measurement value-based satellite navigation systems require lots of times and costs to determine the integer ambiguity, the economic reason makes it difficult to use them in vehicle navigation system or smartphone position based services, but according to an embodiment of the disclosure, the use of the time-differenced carrier phase measurement values eliminates the need to determine the integer ambiguity, and accordingly it is possible to calculate the navigation solution using the low-cost satellite navigation system information receiver.

Additionally, in the existing method that determines the absolute position by directly using satellite navigation system measurement values, a navigation solution jump (discontinuous trajectory) phenomenon occurs with changes in visible satellites, and according to an embodiment, it is possible to prevent a navigation solution jump phenomenon by using time-differenced measurement values instead of directly using satellite carrier phase measurement values.

Second Embodiment

Figure 11:
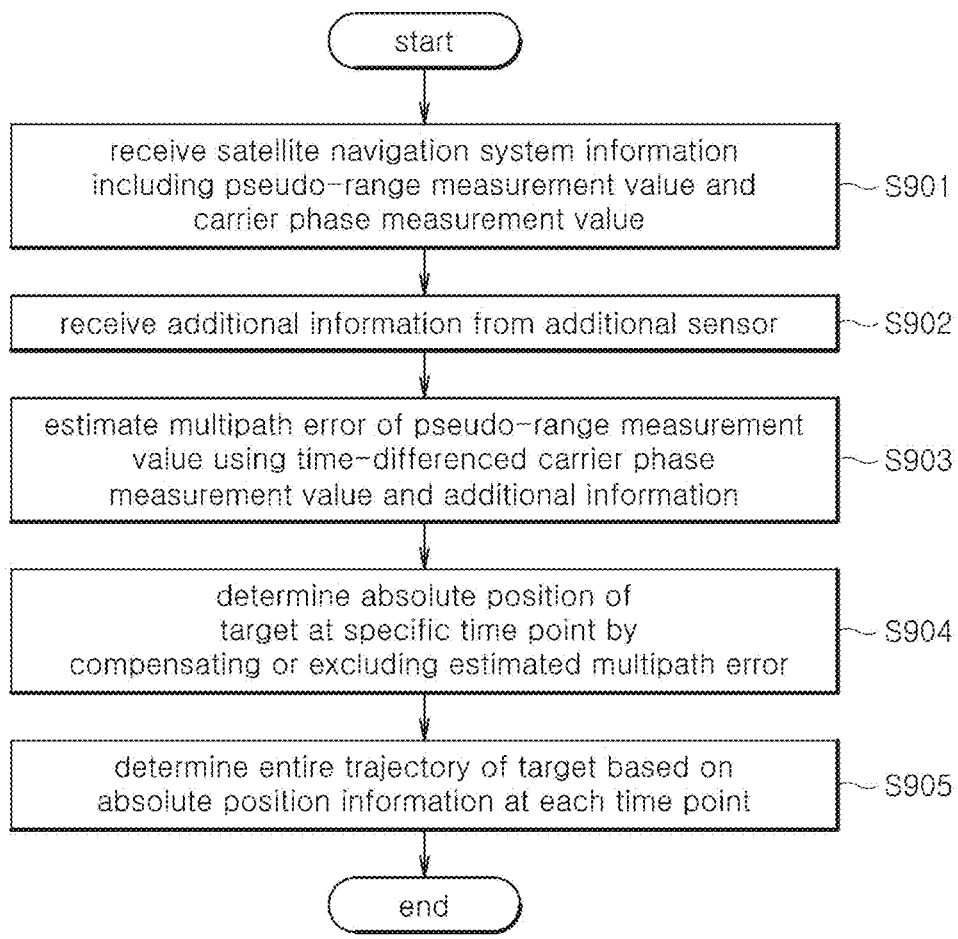
FIG. 11 is a flowchart showing a step of a position measurement method according to another embodiment.

FIG. 11 shows the steps of a position measurement method according to a second embodiment. The method may be performed by a satellite navigation system including a processing device having at least one processor and a satellite navigation information reception antenna. The instructions for executing each step may be stored in a storage medium in the form of a computer program. Also, it does not necessarily represent that each step is performed according to the time sequence.

The position measurement method according to the present embodiment is basically similar to the position measurement method according to the first embodiment described with reference to FIG. 7. However, it is not a method of determining the absolute position by accumulating the relative position to the initial position, but a method of tracking the entire trajectory by calculating the absolute position at a specific time point by compensating the estimated multipath error.

Referring to FIG. 11, first, the step of receiving satellite navigation system information including the pseudo-range measurement value and the carrier phase measurement value (S901) and the step of receiving the additional information from the additional sensor (S902) are performed. Since these steps are similar to steps S701 to S702 in the first embodiment described with reference to FIG. 7, duplicate descriptions will be omitted.

In step S903, a multipath error of the pseudo-range measurement value is estimated using the time-differenced carrier phase measurement value and the additional information. The method of estimating the multipath error performs a process similar to the step S704 in the first embodiment described with reference to FIG. 7. That is, the monitoring variable for detecting a change amount of the multipath error is set, and a period where the multipath error is not extreme is selected to estimate the multipath error existing in the pseudo-range measurement value at a specific time point.

In step S904, the absolute position of the target at a specific time point is determined by compensating or excluding the estimated multipath error. The multi path error included in the pseudo-range measurement value may be compensated by using a multipath mitigation filter (e.g., a hatch filter or a Kalman filter), and the absolute position of the target at a specific time point may be determined based on the pseudo-range measurement value from which the error is removed.

In step S905, the entire trajectory of the target is determined based on the absolute position information at each time point. In the first embodiment, only the epoch at the initial position (t=0) was used, and the remaining paths were determined by accumulating relative positions using TDCP. However, in the second embodiment, the absolute position and movement path of the target may be determined only with the pseudo-range measurement value by using epochs in all time zones.

In the second embodiment, as in the first embodiment, the performance of each step can be improved by using the additional information such as DR information, visual information, radiolocation information, reference station correction information. For example, the additional information may be used when determining the relative and/or absolute position of the target, estimating the multipath error, and detecting a change in the carrier phase measurement value.

The multipath error estimation method and position measurement method according to an embodiment may be implemented as an application or in the format of program instructions that may be executed through a variety of computer components and may be recorded in computer readable recording media. The computer readable recording media may include program instructions, data files and data structures alone or in combination. Examples of the computer readable recording media include hardware devices specially designed to store and execute the program instructions, for example, magnetic media such as hard disk, floppy disk and magnetic tape, optical media such as CD-ROM and DVD, magneto-optical media such as floptical disk, and ROM, RAM and flash memory.

Examples of the program instructions include machine code generated by a compiler as well as high-level language code that can be executed by a computer using an interpreter. The hardware device may be configured to act as one or more software modules to perform the processing according to the present disclosure, and vice versa.

According to the embodiments described above, by estimating and compensating the multipath error included in the pseudo-range measurement value, the position of the target can be precisely determined even in the urban environment with extreme signal distortion. Specific effects that can be obtained through an embodiment of the disclosure are as follows.

By the method of estimating the precise relative position using the time-differenced carrier phase measurement value and estimating the absolute position by accumulating the relative positions, it is possible to prevent signal distortion errors of existing GPS receivers in a deep urban environment and to have continuous precise absolute position. Therefore, a low-cost GPS receiver-based precision navigation system robust to the urban environment is provided.

The carrier phase measurement value used by general GPS receivers has a maximum magnitude of 4 to 5 cm without reference station correction information data. Therefore, the positioning method of the embodiment using this can basically have relative navigation accuracy of cm level without the reference station correction information data. If the reference station correction information is used, higher accuracy can be achieved.

In general, when the carrier phase measurement value is directly used, determining the integer ambiguity is time consuming and costly. Since the disclosure uses the time-differenced carrier measurement value, it is not necessary to determine the integer ambiguity, and thus, a low-cost GPS receiver can be used, and the time and cost required for determining the navigation solution can be reduced.

Since the disclosure uses the time-differenced value of the measured value, unlike the existing absolute navigation system, it is possible to prevent the navigation solution jump (discontinuous trajectory) phenomenon due to the change of the visible satellite, and by introducing the RRAIM method, the integrity of the positioning algorithm can be monitored even in the urban environment lacking visible satellites.

Although the disclosure can determine the position by using the GPS receiver alone, it is easy to build an integrated navigation system with several additional sensors, so it is expected to improve the position accuracy and integrity monitoring performance.

Although the disclosure has been hereinabove described with regard to the embodiments, those skilled in the art will understand that a variety of modifications and changes may be made to the disclosure without departing from the spirit and scope of the disclosure described in the appended claims.

The invention claimed is:

1. A method for estimating a multipath error of a pseudo-range measurement value performed by a processor, comprising:
    obtaining satellite navigation system information including a pseudo-range measurement value and a carrier phase measurement value;
    obtaining a time-differenced carrier phase measurement value by differentiating the carrier phase measurement value with respect to an arbitrary time;
    setting a monitoring variable for multipath error estimation by using the time-differenced carrier phase measurement value, wherein the monitoring variable is defined as a histogram frequency of a difference between the time-differenced carrier phase measurement value and a time-differenced pseudo-range measurement value computed over a moving window;
    detecting a change amount of a multipath error regarding the arbitrary time by using the monitoring variable, and determining a time period usable for estimating the multipath error, the time period being selected as a period corresponding to a highest frequency of the histogram and being divided and used in a cascading multi-step manner; and
    estimating the multipath error at a specific time point by using the change amount of the multipath error relative to an arbitrary reference time, using a multipath mitigation filter.

2. The method of claim 1, wherein the monitoring variable is set based on a characteristic value that is obtained from a combination of measurement values including the time-differenced carrier phase measurement value, or a statistical value or probability distribution of the measurement values.

3. The method of claim 2, wherein the monitoring variable is set further based on additional information including at least one of dead reckoning (DR) information received from a DR sensor, visual information received from a vision sensor, radiolocation information received from a radiolocation sensor, correction information received from a reference station, and a multi-frequency measurement value.

4. The method of claim 1, wherein the time period usable for estimating the multipath error is a period where a level of the multipath error is estimated to be less than or equal to a predetermined value based on the monitoring variable.

5. The method of claim 4, wherein a length of the time period is able to be preset or adjusted in real time.

6. The method of claim 1, wherein the multipath error at the specific time point is estimated using a multipath mitigation filter.

7. The method of claim 1, further comprising detecting a change in integer ambiguity in the carrier phase measurement value,
    wherein the carrier phase measurement value and its time-differenced measurement value are excluded in estimating the multipath error when the change in the integer ambiguity in the carrier phase measurement value is detected.

8. The method of claim 1, further comprising detecting a change in integer ambiguity in the carrier phase measurement value,
    wherein when the change in the integer ambiguity in the carrier phase measurement value is detected, the method further performs estimating a magnitude of the change in the integer ambiguity and then compensating a measurement value for a corresponding magnitude.

9. A computer program stored in a non-transitory computer-readable recording medium for implementing the method for estimating a multipath error of a pseudo-range measurement value according to claim 1.

10. A positioning method performed by a processor, comprising:
    receiving satellite navigation system information including a pseudo-range measurement value and a carrier phase measurement value;
    determining a relative position of a target using a time-differenced carrier phase measurement value;
    estimating a multipath error of the pseudo-range measurement value using the method of claim 1, by selecting a period with non-extreme multipath based on a histogram frequency of a difference between the time-differenced carrier phase measurement value and a time-differenced pseudo-range measurement value, and by using divided estimation periods in a cascading multi-step manner, and by using a multipath mitigation filter;
    determining an initial position of the target by compensating or excluding the estimated multipath error, by reconstructing the pseudo-range measurement value with the estimated multipath compensation; and
    determining an absolute position of the target by accumulating the relative position of the target over time with the initial position of the target.

11. The method of claim 10, further comprising receiving additional information including at least one of dead reckoning (DR) information received from a DR sensor, visual information received from a vision sensor, radiolocation information received from a radiolocation sensor, correction information received from a reference station, and a multi-frequency measurement value,
    wherein the additional information is used in at least one step of determining the relative position of the target, estimating the multipath error, determining the initial position of the target, and determining the absolute position of the target.

12. A positioning method performed by a processor, comprising:
    receiving satellite navigation system information including a pseudo-range measurement value and a carrier phase measurement value;
    estimating a multipath error of the pseudo-range measurement value using the method of claim 1, by selecting a time period corresponding to a highest histogram frequency of a difference between the time-differenced carrier phase measurement value and a time-differenced pseudo-range measurement value and by excluding epochs with extreme multipath while using a multipath mitigation filter; and
    determining an absolute position of a target at a specific time point by compensating or excluding the estimated multipath error.

13. The method of claim 12, further comprising receiving additional information including at least one of dead reckoning (DR) information received from a DR sensor, visual information received from a vision sensor, radiolocation information received from a radiolocation sensor, correction information received from a reference station, and a multi-frequency measurement value, wherein the additional information is used in at least one step of determining a relative position of the target, estimating the multipath error, and determining the absolute position of the target.

* * * * *